United States Patent [19]
Rosenbach

[11] Patent Number: 5,531,254
[45] Date of Patent: Jul. 2, 1996

[54] PORTABLE HAND ACTIVATED CARBONATOR

[76] Inventor: Arnie Rosenbach, 28 Mapel Ave., Erving, Mass. 01344

[21] Appl. No.: 199,589

[22] Filed: Feb. 22, 1994

[51] Int. Cl.$^6$ ................................................ A23L 2/00
[52] U.S. Cl. ................................ 141/113; 141/3; 141/4; 141/17; 141/21; 141/329; 99/323.1; 426/477; 261/DIG. 7
[58] Field of Search ................................ 141/14, 17–19, 141/2–4, 21, 113, 329, 70; 261/52, 64.1, 65, DIG. 7; 426/477; 99/323.1, 323.2

[56] References Cited

U.S. PATENT DOCUMENTS

| | | | |
|---|---|---|---|
| 3,953,550 | 4/1976 | Gilbey | 262/64 R |
| 3,986,535 | 10/1976 | Meckstroth | 141/113 |
| 4,304,741 | 12/1981 | Avison et al. | 426/477 X |
| 4,323,090 | 4/1982 | Magi | 261/64.1 X |
| 4,514,994 | 5/1985 | Mabb | 261/DIG. 7 X |
| 4,548,828 | 10/1985 | Meyers | 426/477 |
| 4,610,282 | 9/1986 | Brooks et al. | 426/477 X |
| 4,867,209 | 9/1989 | Santoiemmo | 141/19 |
| 4,927,569 | 5/1990 | Robinson | 261/79.2 |
| 4,976,894 | 12/1990 | Robinson | 261/64.1 |
| 4,999,140 | 3/1991 | Sutherland et al. | 261/59 |
| 5,021,250 | 6/1991 | Ferguson | 426/231 |
| 5,064,097 | 11/1991 | Brog et al. | 222/129 |
| 5,086,951 | 2/1992 | Nakayama et al. | 222/129 |
| 5,118,009 | 6/1992 | Novitsky | 222/1 |
| 5,260,081 | 11/1993 | Stumphauzer et al. | 426/477 |
| 5,329,975 | 7/1994 | Heiteh | 141/17 |
| 5,343,904 | 9/1994 | Kaeser | 141/113 X |
| 5,396,934 | 3/1995 | Moench | 141/4 X |

*Primary Examiner*—J. Casimer Jacyna
*Attorney, Agent, or Firm*—Alden Gray

[57] ABSTRACT

A device for carbonating liquid refreshments whereby a high degree of saturation can be obtained with a single application because the entire mechanism, including an easily clamped on drink bottle and carbon dioxide ($CO_2$) canister, may be easily shaken while pressurized $CO_2$ is being applied to liquid in the drink bottle.

4 Claims, 8 Drawing Sheets

Fig. 13

PORTABLE HAND ACTIVATED CARBONATOR

BACKGROUND

The present invention relates to an apparatus for carbonating beverage liquids, and in particular an apparatus that may easily be carried directly to party goers for carbonating drinks at their table or where they stand.

Carbonization of fluids for making drinks more interesting and palatable has been done for centuries. Early processes involving natural fermentation to generate carbon dioxide gas ($CO_2$) had closed casks to ensure high pressures. More recent commercial processes use cylinders of high pressure $CO_2$ and a variety of means for getting the gas in contact with the liquid where it is dissolved. A great many designs for carbonating equipment have been generated over the years.

Known smaller versions for domestic use allow carbonating of single to a few servings utilizing common plastic bottles. Two examples out of many are shown by U.S. Pat. No. 4,927,569 issued to Robinson in 1990, and by U.S. Pat. No. 4,999,140 issued to Sutherland et al in 1991. All have limits by reason of needing a capped drink bottle which can waste time attaching the bottle to the carbonator. Robinson's, Sutherland's and all other known carbonators for multiple servings are not truly portable, and certainly cannot be shaken, in that they need to be bench supported due to shape, weight, or bottle attachment method. The drink must be brought to the carbonating rig and several separate applications of $CO_2$ must be made to get full carbonation. Other small versions use nonreusable CO2 cartridges which are totally unacceptable because throw-away canisters contribute excessively to the solid waste stream. Existing carbonators require that the bottle be held against supply pressure manually or with an over reaching body enclosure, not as in the present invention where a mechanically advantaged clamp simply and quickly allows a firm connection easily controlled by an operator's hand while shaking the drink to promote a high degree of carbonization in a single application.

SUMMARY OF THE INVENTION

The present invention is a portable beverage carbonator with an improved bottle connection means and a novel manual control and grip means between a small refillable $CO_2$ canister and a plastic beverage bottle. The improved connection means is provided by a mechanically advantaged clamp. The control and grip means includes an operational handle and tubular housing which contains a pressure regulating device for reducing the high pressure within the source canister to a pressure useable within the beverage bottle, an actuating means for opening and closing a valve means that allows $CO_2$ to flow or be shut off, a reverse flow stop valve to keep fluid and air out of the actuating means, and a nozzle to provide a jet stream of tiny $CO_2$ bubbles to the drink being carbonated. The clamp is actuated by a handle that also is functionally connected to the actuating means for starting, controlling, or stopping the flow of gas. The entire system is portable and is light enough to allow shaking while pressurizing the bottle and thereby getting a high degree of carbonization in a single application. Since the bottle need not be inverted during this process, no bottle cap is necessary, but may be used, especially if the bottle of drink is to be stored or transported for later consumption.

It is an object of this invention to provide a fully portable carbonization system for home use or, more desirably, for catering parties where many already opened drinks may be spirited quickly.

A further object is to provide a carbonization system that allows shaking the beverage while adding the $CO_2$ under pressure to obtain a high level of carbonization in a single application.

Also, an object is to provide a carbonator that utilizes $CO_2$ more efficiently to maximize the number of drinks carbonated with a small canister of the gas.

Yet another object is to provide a carbonization system that does not require special and separate caps, plugs, or canisters, thereby reducing the accessories that need to be carried with the carbonator.

It is known that apple juice in particular, and fruit juices in general, tend to foam for a period of time after being spirited. One result of use of the present invention seems to be that foaming is significantly less than with other commercially available carbonators. Although not proven, the improvement may be due to the nozzle providing a jet stream of tiny bubbles and the reverse flow stop valve keeping air from mixing with $CO_2$ within internal parts of the control. Air in the bottle can be reduced by squeezing the bottle just before tightening the clamp.

DESCRIPTION OF THE PREFERRED EMBODIMENT

Figure 1:
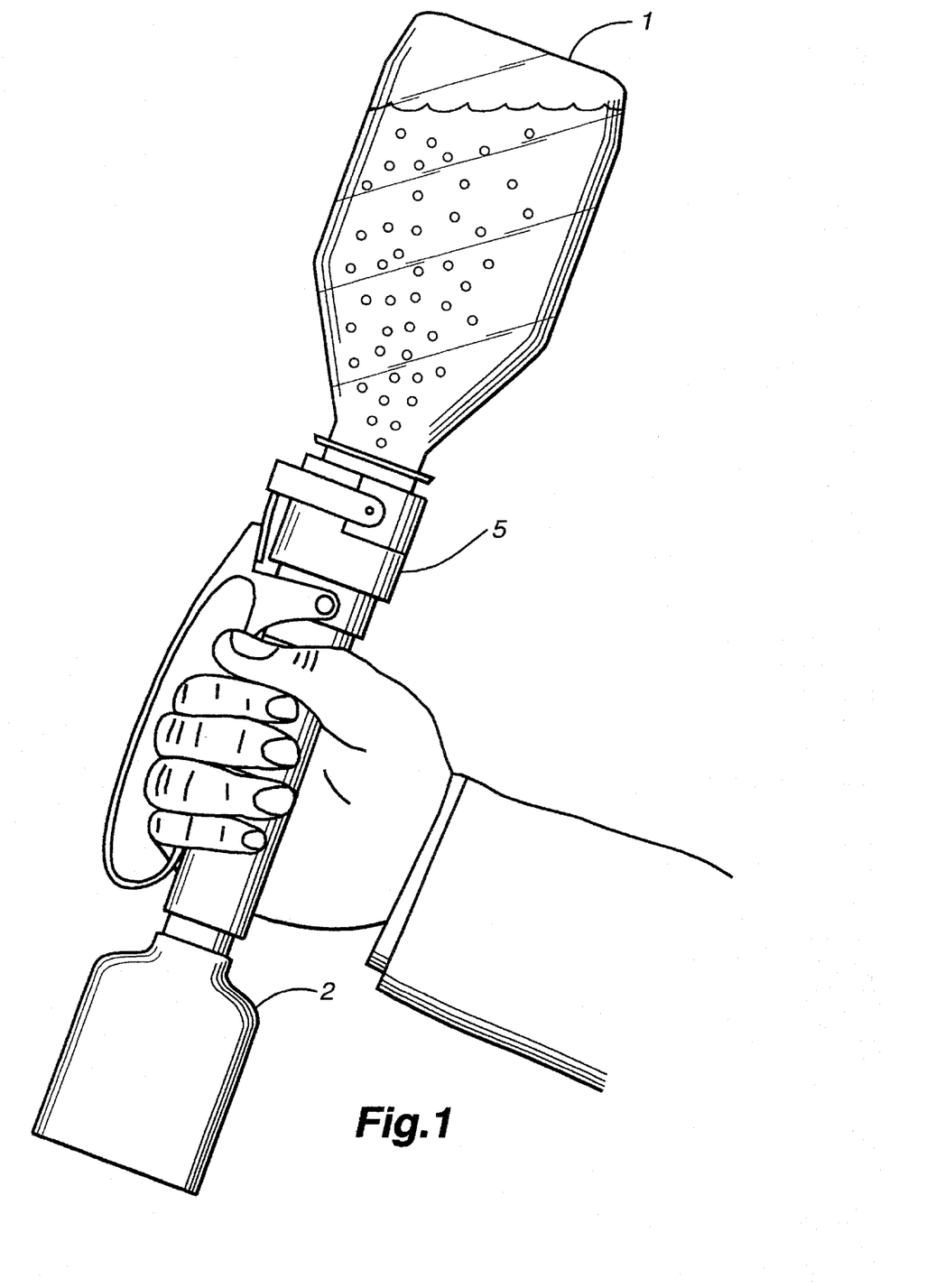
FIG. 1 is a pictorial showing the invention as being used to carbonate a drink. The drink bottle shown as being inverted is representative of only one possible position of many, as it can be easily appreciated that any orientation works well because shaking mixes and distributes $CO_2$ thoroughly to make an evenly saturated solution.

As shown in FIG. 1, the invention consists of a control section 5 connected to a $CO_2$ canister 2 and also to a plastic drink bottle 1. Said control section 5 acts to release $CO_2$ from the canister 2, reduce the source pressure to a desired level, and pass the $CO_2$ into fluid in the drink bottle 1 all while the entire invention is being shaken to promote the dissolving of the $CO_2$ in the fluid. The fully portable nature of the invention allows any spacial orientation during the process.

Figure 2:
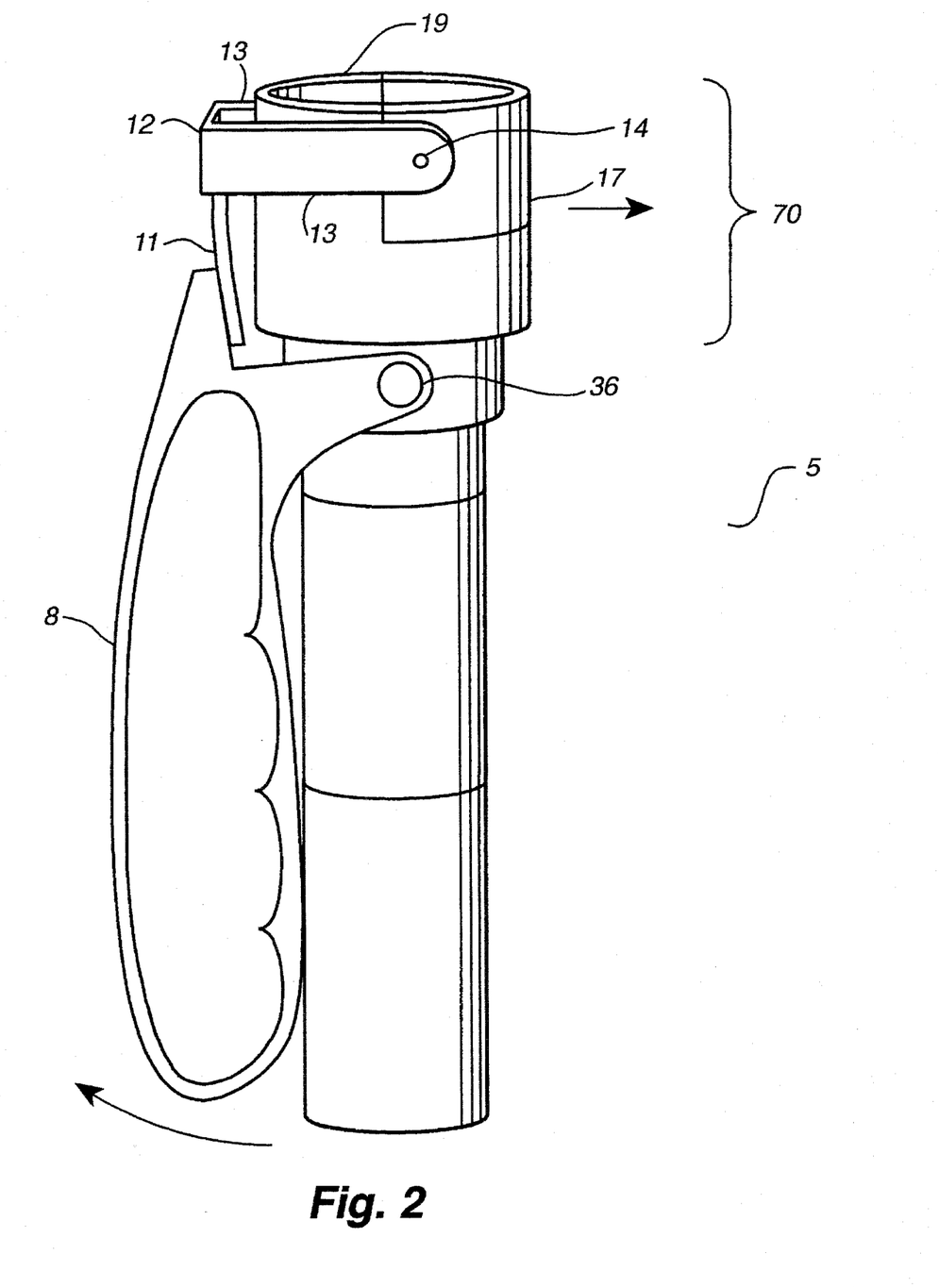
FIG. 2, a pictorial of the operator's control section 5 as in FIG. 1 without the $CO_2$ canister 2 and without drink bottle 1, shows detail of the clamp section 70.

Detail of the bottle clamp 70 as part of the control section 5 can be seen from FIG. 2. A first end of steel handle spring 11 is rigidly connected to the handle 8, and its second end is rigidly connected to the clamp yoke 12 centrally between two rigid clamp yoke arms 13 of suitable material. Metal clamping members are a fixed jaw 19 rigidly connected to the tubular body of control section 5 and a moveable jaw 17 pivotally connected front and back at the clamp yoke pivots 14 to the clamp yoke arms 13. As viewed in FIG. 2, rotating handle 8 clockwise, pivoting on and rotating actuator 36, translates through spring 11, yoke arms 13, and clamp yoke pivots 14 to move the moveable jaw 17 away from fixed jaw 19 opening the clamp which allows a drink bottle 2 to be positioned for clamping. Forcing the handle 8 inward and counter clockwise closes moveable jaw 17 toward fixed jaw 19 compressing any drink bottle 2 therebetween with a force limited by the handle spring 11.

Figure 3:
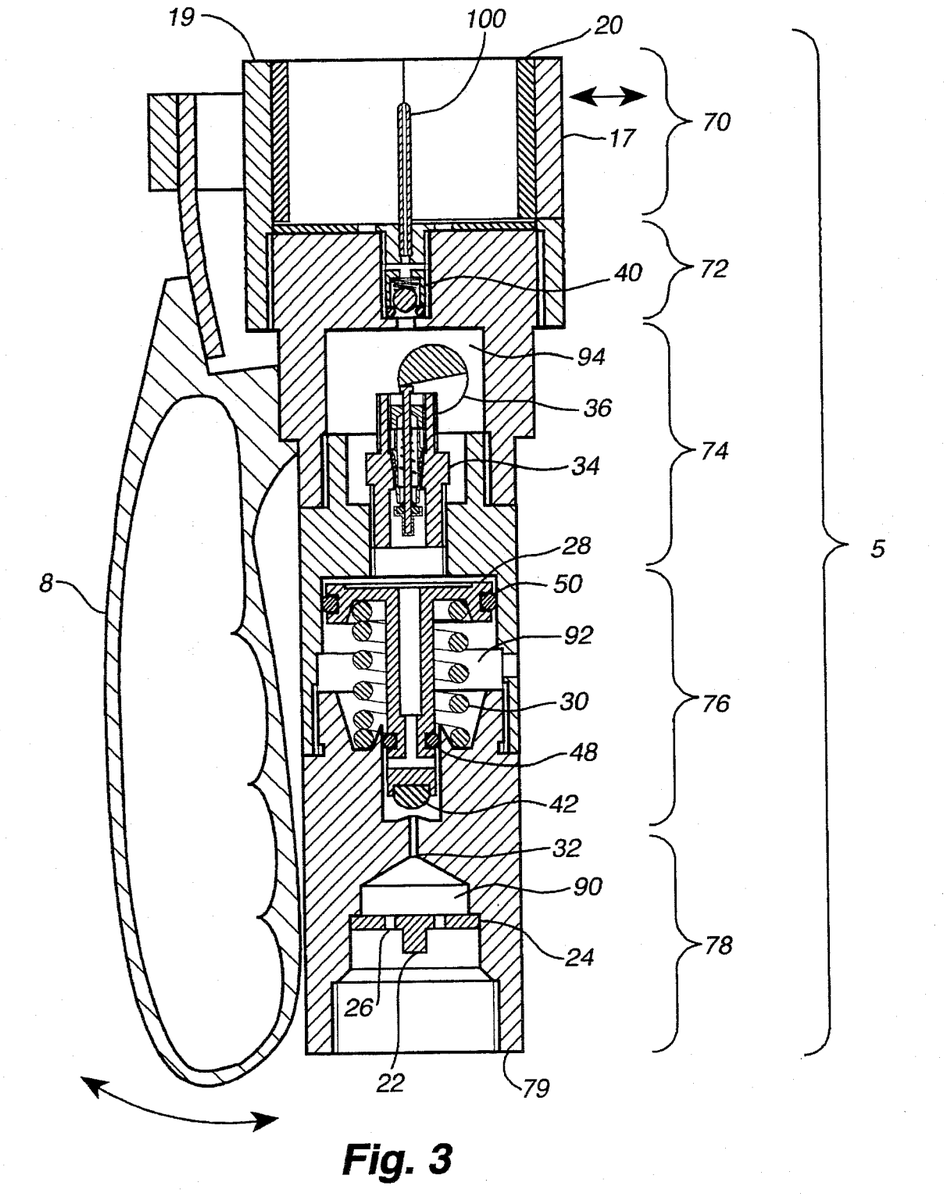
FIG. 3 is a sectional view of the control section 5 assembly showing pertinent internal parts.
Figure 4:
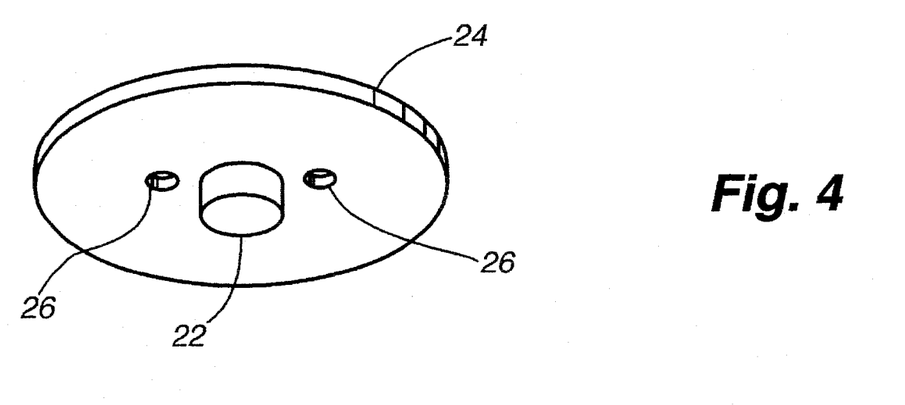
FIG. 4 is a pictorial of the canister pusher disk 24.
Figure 5:
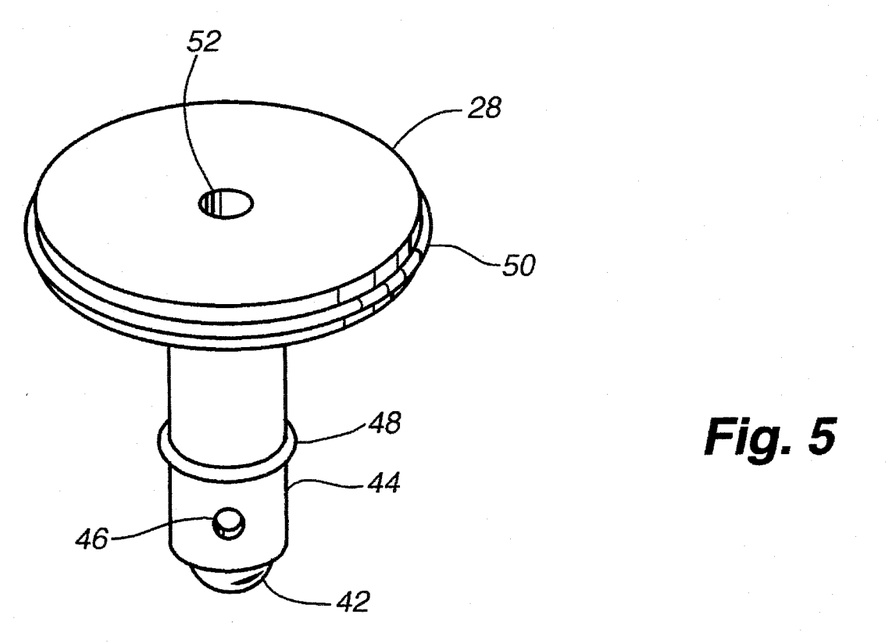
FIG. 5 is a pictorial showing detail of regulator piston 28.
Figure 6:
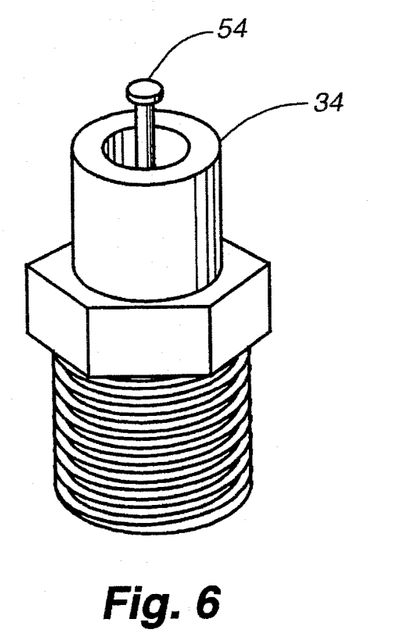
FIG. 6 is a pictorial of a typical commercially available tank pin valve 34 with FIG. 7 showing a sectional view of such pin valve 34.
Figure 7:
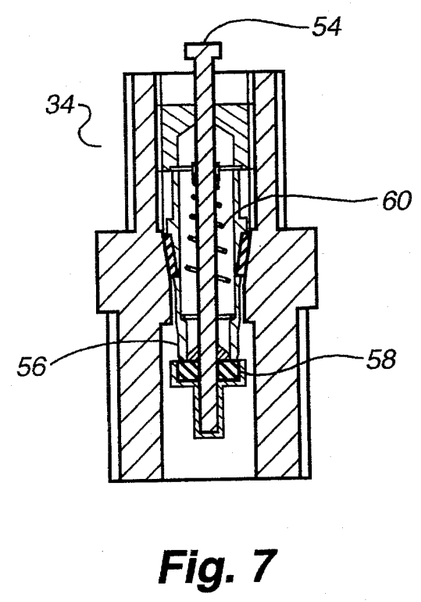
Figure 8:
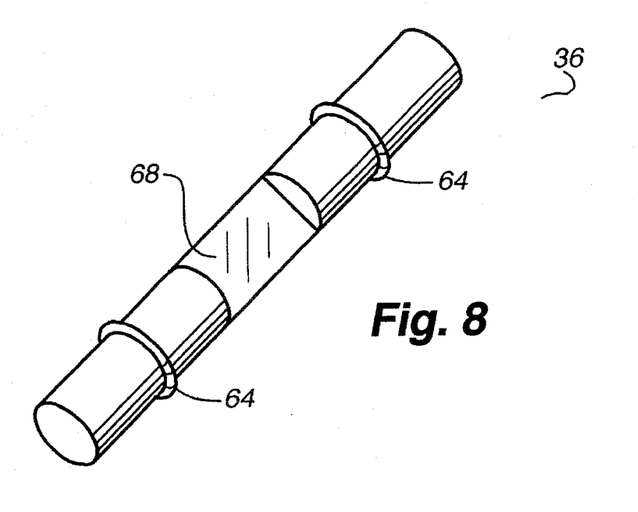
FIG. 8 is a pictorial showing detail of the actuator 36.
Figure 10:
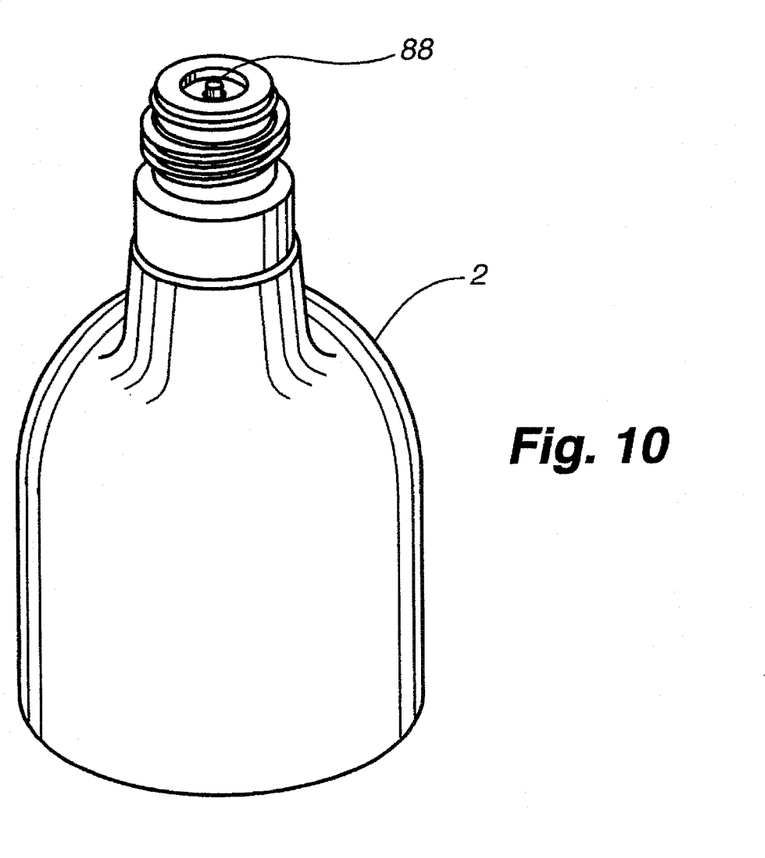
FIG. 10 is a pictorial of a typical commercially available refillable $CO_2$ canister with a pin valve type closure.

The operational parts of the control section 5 can be described by following the path of $CO_2$ from the canister 2 to the drink bottle 1. As shown in FIG. 3, a canister connect section 78 has a threaded end port to allow conventionally connecting a commercially available refillable $CO_2$ canister 2 that conventionally has a closure valve actuated by depressing a canister valve stem 88, FIG. 10. In the present invention upon screwing a canister 2 into end port 79, said stem 88 is depressed by a pusher pin 22 allowing high pressure $CO_2$ to flow out of the canister 2.

High pressure $CO_2$ from the canister 2 flows through disk ports 26 in pusher disk 24 into a first cavity 90. A regulator inlet orifice 32 from said first cavity 90 allows $CO_2$ to flow to the regulator section 76.

Active parts of said regulator section 76 consist of a second cavity 92 which contains a regulator piston 28 and a regulator spring 30. Operation of said regulator section 76 to regulate outlet pressure is conventional. High pressure $CO_2$ from regulator inlet orifice 32 pushes past the regulator ball 42, through stem orifice 46 which is a passage way to head port 52, out said head port 52 filling the portion of second cavity 92 over piston 28 and pushing piston 28 against the regulator spring 30. As the pressure over piston 28 exceeds the design pressure set by the strength of spring 30, the excess force on piston 28 compresses spring 30 and the motion is passed through piston stem 44 to regulator ball 42 closing the orifice 32. To allow a differential pressure across piston 28, the lower portion of the second cavity 92 is not sealed to atmosphere, but is sealed from the $CO_2$ path by stem O-ring seal 48 and piston head O-ring seal 50.

A commercially available tank pin valve 34 separates a third cavity 94 from said second cavity 92. The third cavity 94 contains the actuator 36 which communicates motion of handle 8, by means of rotation of a lip 68, to the pin valve stem 54. Squeezing the handle 8 tightly enough toward the regulator section 76, rotates the actuator 36, pivotally located in the manual control section 74. Rotation of actuator 36 causes lip 68 to push pin valve stem 54 which causes pin valve spring 60 to compress and opens the closure of pin valve seal 58 to pin valve seat 56. This in turn allows $CO_2$ to flow into the third cavity 94, past the reverse flow stop valve 40 in the back stop section 72, through needle like nozzle 100, and on into a drink bottle 2 held in the clamp section 70. Actuator O-rings 64 serve to seal the third cavity 94 allowing differential pressure without leaking $CO_2$ to the outside atmosphere.

Because the entire assembly is small and light enough to be shaken with one or two hands while handle 8 is squeezed toward the control section 5, thorough distribution of $CO_2$ throughout the drink while under constant source pressure will allow $CO_2$ to rapidly dissolve until even saturation occurs.

With little experience, a server can determine requested levels of carbonization and can stop the process by releasing the handle 8 which first allows the pin valve 34 to close stopping the flow of $CO_2$. Further releasing the handle 8 and relaxing the handle spring 11 allows the clamp section 17 to release the drink bottle 2.

Figure 9:
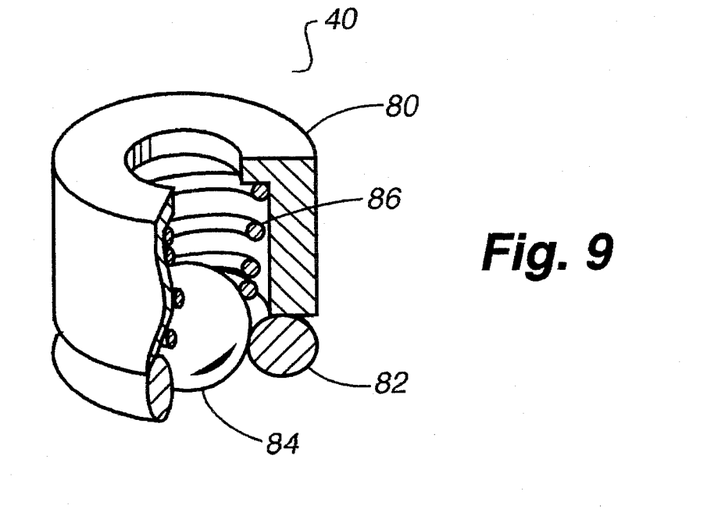
FIG. 9 is a pictorial cut away showing detail of the reverse flow stop 40.

A reverse flow stop valve 40 is provided within the stop valve section 72 to keep liquid and air from flowing back into the third cavity 94 which might otherwise happen when the pressure in the drink bottle 1 is equalized with the pressure in the third cavity 94 and shaking is being applied. Said reverse flow stop valve 40 is of conventional design and consists of a retainer 80 which holds the stop spring 86 and stop ball 84 against the stop valve O-ring 82 unless sufficient differential pressure is available within the third cavity 94 to overcome the light spring force allowing $CO_2$ only to escape one way toward the drink 1.

Figure 11:
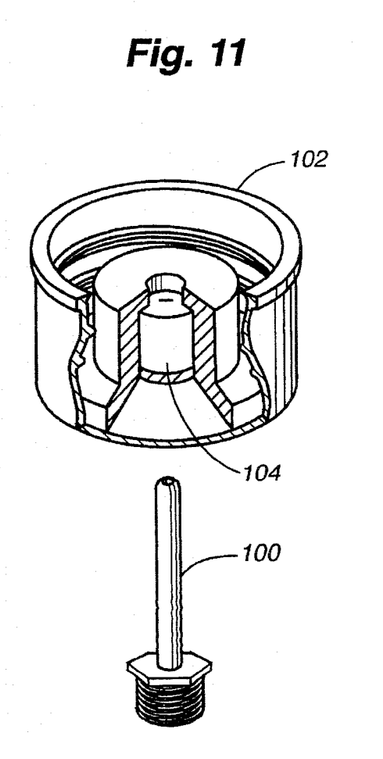
FIG. 11 shows a nozzle and an optional cap useful for beverages to be stored or transported after carbonating.
Figure 12:
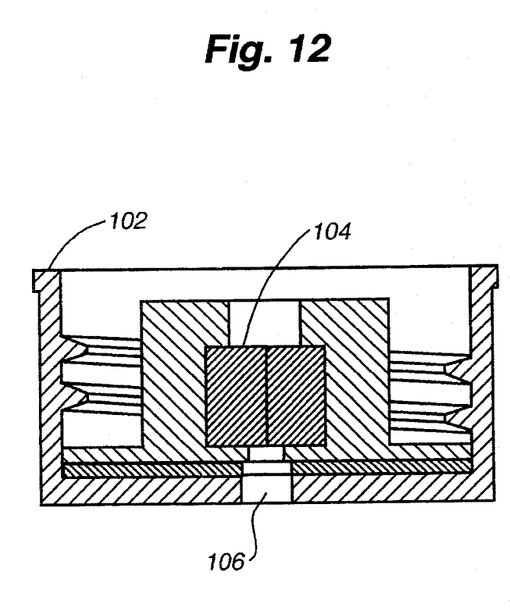
FIG. 12 is a sectional view of the cap in FIG. 11.

Although an elastomeric gasket 20 preferably made of a closed cell sponge rubber may be placed within the clamp section 70, FIG. 3, to seal the drink bottle 1 while carbonating an uncapped drink, the needle like nozzle 100 may be used to penetrate an elastomeric cap seal 104, FIG. 11, which has been inserted into a bottle cap 102. Said elastomeric cap seal 104 is commercially available from suppliers to the inflatable toy industry. Said bottle cap 102 may be made by drilling or punching a hole 106 in a standard plastic drink bottle cap.

Said needle like nozzle 100 is preferably fabricated from a stainless steel for durability and cleanability, and preferably has a straight hollow bore inside diameter of 1 to 2 millimeters. Said hollow bore is sized to reduce the flow rate of gas and thereby optimize bubble nucleation for tiny bubbles and efficient gas usage.

Figure 13:
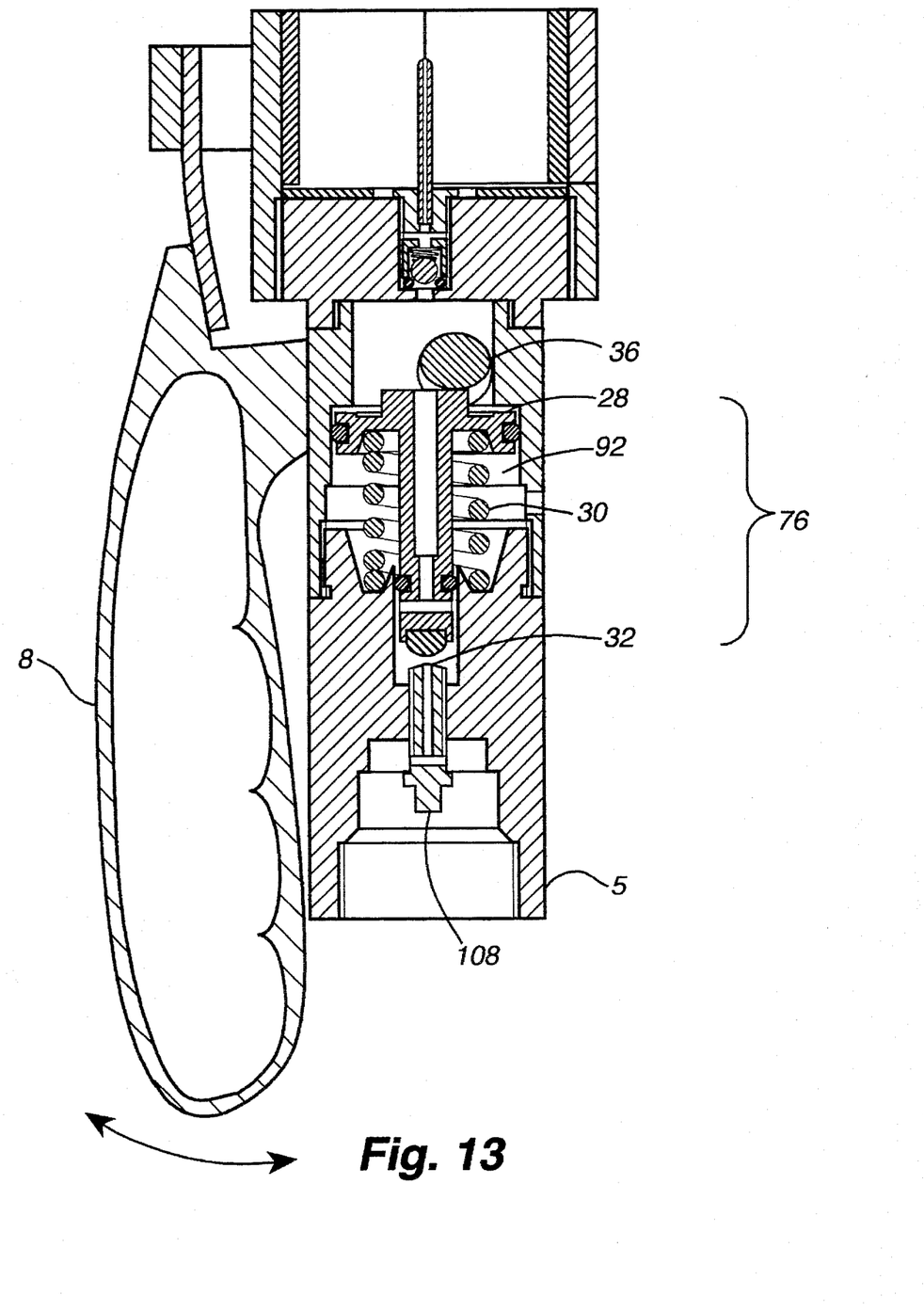
FIG. 13, as referenced to FIG. 3, shows an alternate embodiment wherein the tank pin valve 34 is deleted and the regulator piston 28 assumes the function of allowing manual control of gas flow. Pusher pin 22 and pusher disk 24, of FIG. 3, are also replaced with an adjustable regulator valve seat pin 108.

FIG. 13 depicts a second embodiment of several arrangements envisioned as possible. In comparing FIGS. 3 and 13, the tank pin valve 34 has been removed for the embodiment of FIG. 13, and the actuator 36 pushes directly on the regulator piston 28 to close orifice 32 when the handle 8 is in its clockwise relaxed position. When the handle 8 is squeezed tight to the control section 5, as is depicted, the regulator piston 28 is no longer held down by the actuator 36 and is thereby allowed to be controlled by differential gas pressures operating in conjunction with tension in spring 30 to regulate gas flow, as described before. The function of the tank pin valve of FIG. 3 is thereby retained by the action of the regulator section 76, in FIG. 13.

Also comparing FIG. 3 and 13, pusher disk 24 and pusher pin 22 have been replaced, in FIG. 13, with an adjustable valve seat pin 108. Said valve seat pin 108 may be pressed to a position for proper regulating pressure. Other means of adjusting the regulating pressure either at the factory or by the user include threading the adjustable seat pin and adjusting pressure by turning the pin, adding or deleting spacers at either end of spring 30, and allowing cavity 92 to be elongated by separating sections of the control section 5.

One application for using the present invention would be at a catered informal outdoor party where efforts to reduce trash include not using cups or drink glasses. A caterer would attach a $CO_2$ canister 2 to a control section 5 and carry it with him in a belt holster or in his hands as he circulated among party goers. When someone wanted a drink carbonated or the carbonation of a drink increased, the caterer would place the drink bottle 1 upright into the clamp section 70, squeeze the handle 8 toward regulator section 76 to clamp the drink bottle tightly making the assembly rigid and free to move in any orientation, and then squeeze the handle further to start the flow of $CO_2$ while shaking the entire assembly. After a few seconds the caterer would release the handle 8 and hand a refreshed drink back to a grateful patron.

I claim:

1. An improved portable device for carbonating beverages comprising a refillable pin valved canister with a threaded connector for providing pressurized carbon dioxide gas, a tubular control section means connectable via mating threads to said threaded connector of said canister for regulating the flow of carbon dioxide passing through the section, a plastic drink bottle holding a liquid beverage to be carbonated, and internal control features of said tubular control section means comprising a pusher for opening said pin valved canister allowing gas to flow into chambers and passageways within said tubular control section means, a gas pressure regulator means for controlling the flow and pressure of gas before exiting, a reverse flow stop valve for keeping said liquid beverage from fouling any internal control features, and an exit orifice for allowing regulated gas to flow into the drink bottle, with improvements comprising a handle movably connected to said tubular control section means and juxtaposed to said tubular control section means making a grip combination such that said handle may be operated concurrently with gripping said tubular control section means, said handle having a member positioned to actuate intentional operation of said gas pressure regulator means to allow gas flow there through, a bottle clamp with a moveable jaw mechanically linked to said handle, and said bottle clamp positioned about said exit orifice to firmly hold said drink bottle in a position to receive gas from said exit orifice when forced closed by action of said handle, whereby pressurization with carbon dioxide will be maintained while being shaken to dissolve carbon dioxide into said liquid beverage.

2. A fully portable hand activated carbonator comprising a conventional refillable pressurized canister of carbon dioxide with a pin valve closure, a plastic drink bottle containing a fluid to be carbonated, a tubular control section having a first end and a second end with internal controls therebetween which provide a controllable gas passageway from the entering of said first end through to the exiting of said second end, a bottle clamp having a closeable jaw opposing a jaw attached at said second end of said tubular control section for clamping said drink bottle in a sealed position at said second end for receiving carbon dioxide that has passed from said canister through said internal controls, a manual control section of said internal controls for starting and stopping the flow of carbon dioxide therethrough, a lever type handle movably connected to the exterior of said tubular control section and mechanically linked to said closeable jaw for operating said closeable jaw of said bottle clamp, said handle also mechanically linked to said manual control section to provide the force for starting the flow of gas, said first end of said tubular control section configured with threads and attached to said canister of carbon dioxide, said first end also configured with a pusher pin for releasing carbon dioxide from said canister when said first end is attached to said canister, a regulator section of said internal controls for providing pressure regulation of carbon dioxide gas passing therethrough, a reverse flow stop section of said internal controls for providing reverse flow blocking means to keep fluid from entering and contaminating said manual control section, and the shape and size of said lever type handle and said tubular control section combined providing a hand grip whereby the entire assembly may be simultaneously operated and shaken.

3. The carbonator of claim 2 wherein said manual control section for starting and stopping the flow of gas comprises a conventional pin valve actuated by a contacting lip on an actuator pivoted by said handle.

4. A method of carbonating beverages in plastic bottles comprising the steps of providing a canister of pressurized carbon dioxide with a threaded means for attaching connectors and a canister pin valve for releasing the gas, providing a plastic beverage bottle having a mouth and filled with a liquid to be carbonated, threading to said canister a carbonator mechanism comprising a tubular control section having internally a pusher pin for engaging and opening said canister pin valve, a pressure regulator for reducing the high pressure within said canister to a desirable pressure that can be contained by said plastic beverage bottle, an actuator with control means to stop or start the flow of regulated gas, a reverse flow stop valve to keep air and beverage out of the interior of said control section, and an exit orifice, and having mechanically linked externally a clamp mechanism wherein said tubular control section and clamp mechanism form a grip that may be squeezed to first close the clamp and then with added force cause said actuator to start the flow of gas, placing an open said clamp over and around said mouth of said beverage bottle with said exit orifice in open communication with said liquid, squeezing with one hand said grip closing said clamp to rigidly engage and seal said bottle to said control section leaving said exit orifice in open communication with said liquid, further squeezing said grip starting the flow of carbon dioxide into said bottle, raising and shaking the entire assembly with one hand agitating said liquid under maintained carbon dioxide pressure in said beverage bottle whereby the carbon dioxide will be dissolved rapidly to saturation within said liquid, and holding said bottle while slowly releasing the squeeze on said grip thereby first stopping the gas flow and then releasing said clamp to allow separating the bottle and its carbonated liquid from said carbonator mechanism.

* * * * *